No. 877,210. PATENTED JAN. 21, 1908.
R. L. MARTIN, Jr. & W. W. MACFARREN.
CONVEYER.
APPLICATION FILED JAN. 14, 1907.

No. 877,210. PATENTED JAN. 21, 1908.
R. L. MARTIN, Jr. & W. W. MACFARREN.
CONVEYER.
APPLICATION FILED JAN. 14, 1906.

Witnesses:
Chas. S. Ripley
E. R. Rodd

Inventors.
Robt. L. Martin Jr.
Walter W. Macfarren
by O. M. Clarke
Their Attorney No. 877,210. PATENTED JAN. 21, 1908.
R. L. MARTIN, Jr. & W. W. MACFARREN.
CONVEYER.
APPLICATION FILED JAN. 14, 1907.

Witnesses:

Inventors.

No. 877,210. PATENTED JAN. 21, 1908.
R. L. MARTIN, Jr. & W. W. MACFARREN.
CONVEYER.
APPLICATION FILED JAN. 14, 1907.

UNITED STATES PATENT OFFICE.

ROBERT L. MARTIN, JR., AND WALTER W. MACFARREN, OF PITTSBURG, PENNSYLVANIA, ASSIGNORS OF THREE-FOURTHS TO SAID MARTIN AND ONE-FOURTH TO SAID MACFARREN.

CONVEYER.

No. 877,210.  Specification of Letters Patent.  Patented Jan. 21, 1908.

Application filed January 14, 1907. Serial No. 352,242.

*To all whom it may concern:*

Be it known that we, ROBERT L. MARTIN, Jr., and WALTER W. MACFARREN, citizens of the United States, residing at Pittsburg, in the county of Allegheny and State of Pennsylvania, have invented certain new and useful Improvements in Conveyers, of which the following is a specification, reference being had therein to the accompanying drawing.
Our invention refers to improvements in conveyers and is particularly designed as a coke conveyer for the purpose of transporting coke from an oven door to any desired point of discharge, for depositing it into cars or elsewhere.

The invention is intended to be used in conjunction with any suitable coke drawing apparatus, as for instance the machine shown and described in our prior application filed Dec. 21st, 1906 bearing the Serial Number 348,896, and to receive the coke as drawn, convey it laterally along in front of the oven and then outwardly at any desired angle to the ovens or to the original line of travel, and at any suitable angle of elevation, to the point of discharge.

Generally stated, the conveyer consists of a continuous series of flights and universally connected or jointed carrying means arranged to travel along a trough mounted upon a suitable framework having supporting, driving and adjusting mechanism, and adapted to operate in the manner hereinafter described.

Referring to the drawings:
Figure 1 is a general plan view, partly broken away, showing the conveyer located in position for operation with relation to the oven and in conjunction with a drawing machine.
Fig. 2. is a detail view in elevation showing a ratchet driven head shaft for the conveyer.
Fig. 3. is a sectional view on the line III. III. of Fig. 2.
Fig. 6. is a view in elevation showing the other or delivery end of the conveyer.
Fig. 7. is a detail view of the lower portion of the delivery end of the conveyer, the upper structure and the traveling mechanism having been removed.
Fig. 8. is an enlarged detail view showing the adjustable delivery spout.
Fig. 9. is a cross section on the line IX. IX. of Fig. 8.
Fig. 16. is a plan view of Fig. 14. Fig. 17. is an enlarged sectional view, partly broken away, taken on the line XVII. XVII. of Fig. 1.

Figures 1, 2, 3:
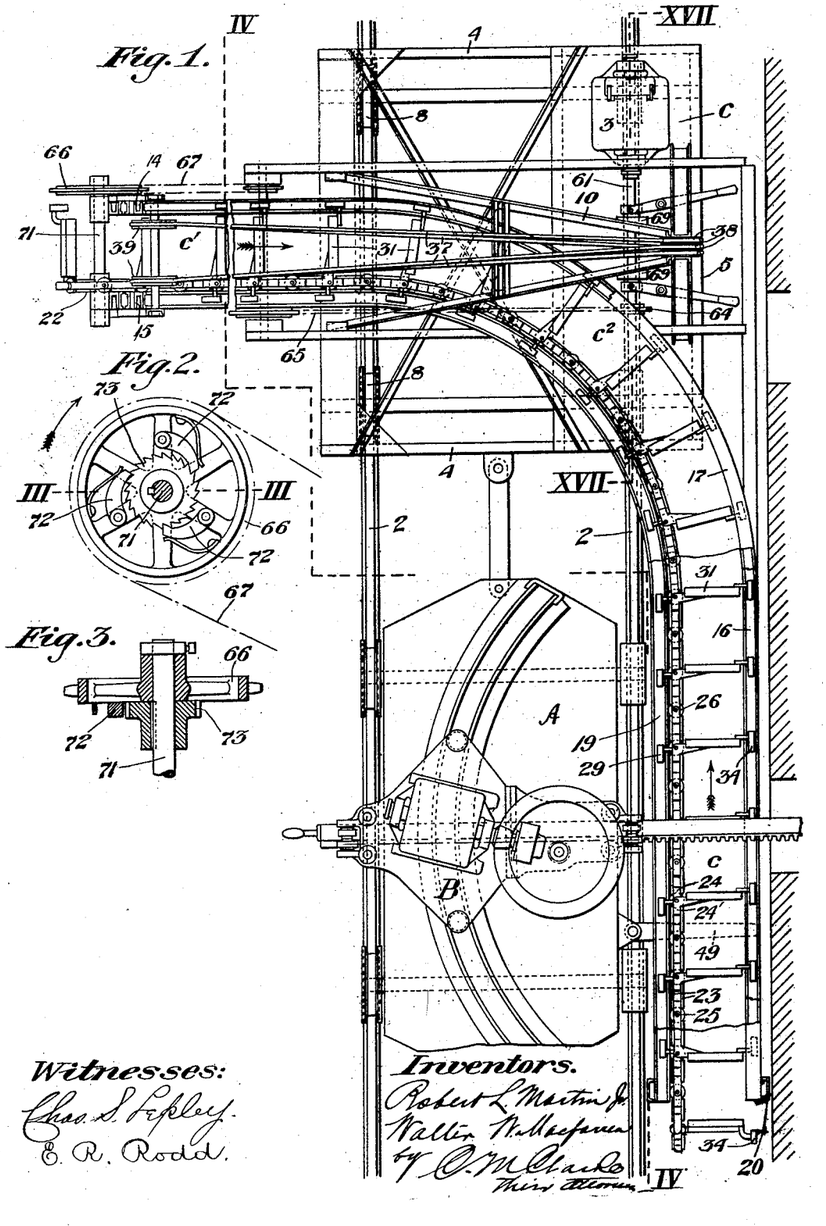

The apparatus comprises generally a truck C and the conveying mechanism carried thereby, mounted upon tracks 2, 2, extending along in front of a bank of coke ovens, or in operative relation to any other structure with which the conveyer is desired to be used. The conveyer truck C as shown in Fig. 1, is coupled with a coke drawing apparatus comprising a truck A and adjustable carrier B provided with an extractor, similar to the machine shown in our prior application above referred to, but may be used in conjunction with any other type of drawing machine or independently as desired. The conveyer truck is provided with a motor 3 of any suitable type, as an electric motor, from which the power is taken for propelling the apparatus along the tracks and also for operating the conveyer, although separate motors may be employed for each service if preferred. The truck C is preferably constructed of structural steel, comprising a framework composed of side and end sills 4 and 5 of channel or other suitable form, properly braced, mounted by suitable bearings on axles 6 having supporting wheels 7, 8, running on tracks 2. As shown, the inner wheels 7 are quite broad and flat across the tread, merely resting on the top of the inner rail, while the outer wheels 8 are heavily flanged at each side so as to embrace the head of the rail and brace the carriage against strains in either direction, and insure traction independent of any variations in parallelism of the rails.

Figures 6, 7, 8, 9:
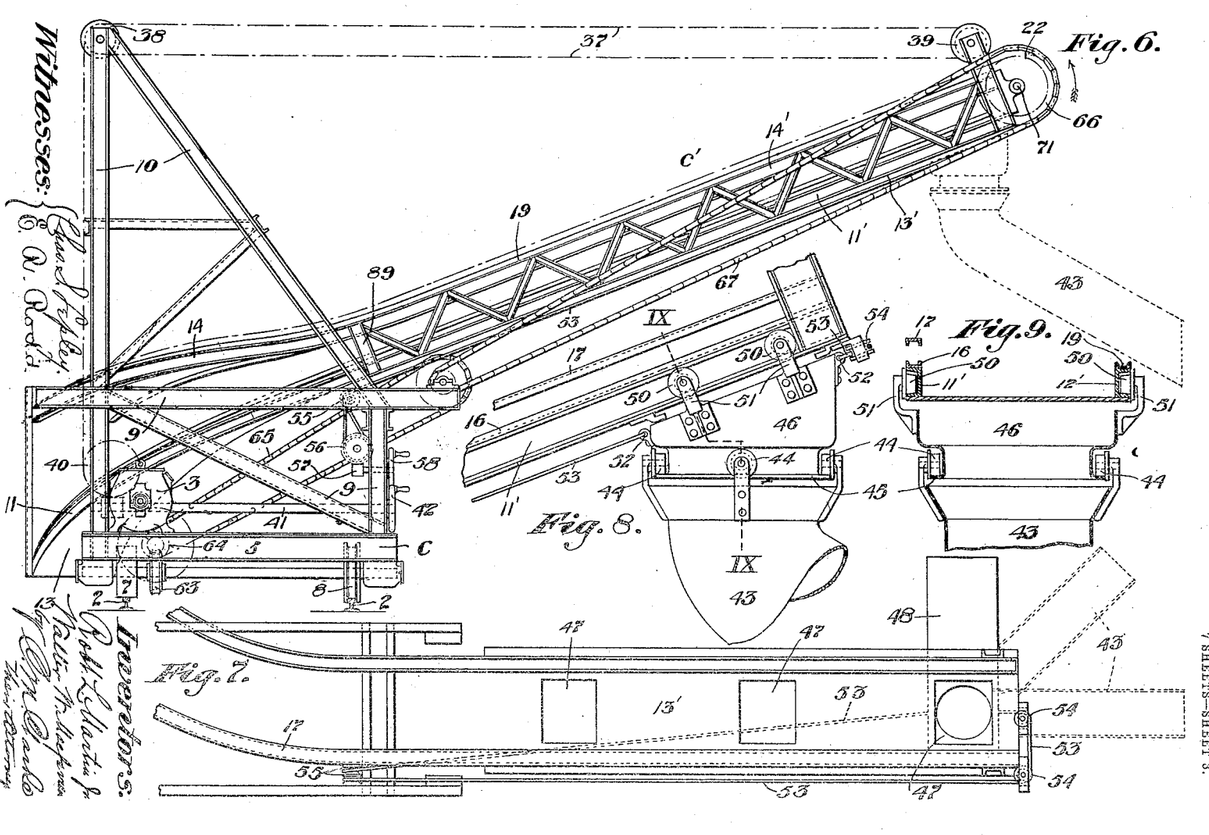
Figures 10, 11:
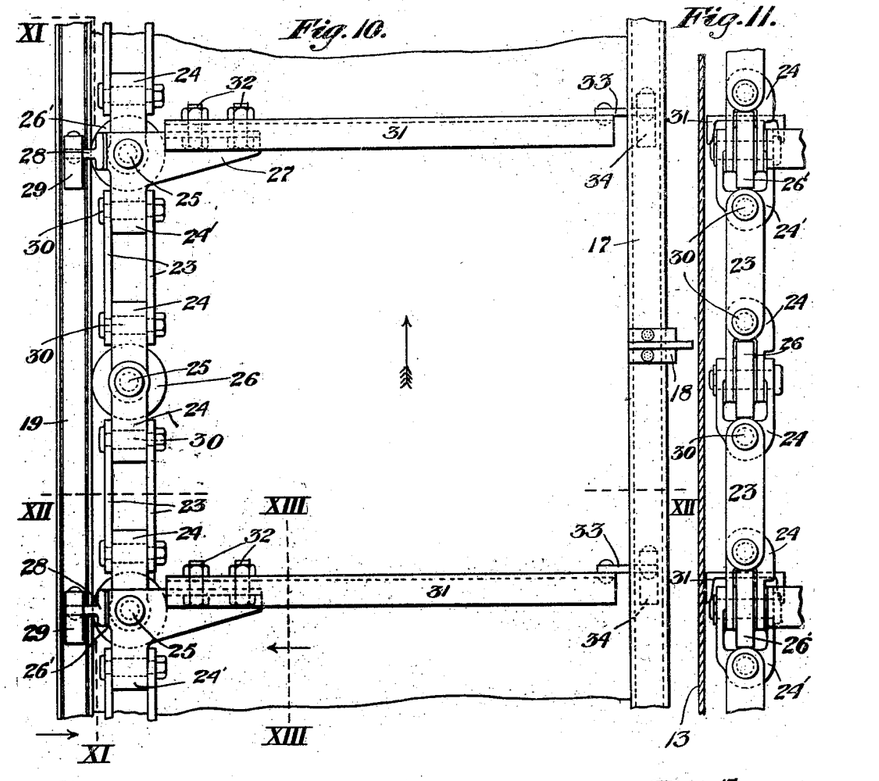
Fig. 10 is an enlarged detail plan view of a portion of the conveyer, showing the lower or operating flights as indicated in the broken away portion of Fig. 1.
Fig. 11 is a sectional elevation taken on the line XI. XI. of Fig. 10 showing the flexibly connected flight chain.

9 is an upper structural framework properly designed to support the conveyer and provided with an upwardly extending tower 10 for counterbalancing and adjusting the delivery end of the conveyer as clearly shown in Fig. 6. The conveyer proper is mounted upon said framework and consists generally of one continuous carrying chain of the "endless" sprocket type, provided with laterally arranged flights, disposed in upper and lower oppositely traveling series, in two main portions, i. e. a receiving portion or leg $c$ and a delivery portion or leg $c'$. The conveyer is designed with such a degree of universal flexibility that it will pass through intermediate curved sections $c^2$ on horizontal or inclined planes and will also pass around the various supporting and driving sprocket wheels in different planes, so as to traverse the whole distance from the receiving point to the delivery point by means of one continuous flexible carrying structure.

The entire lower series of flights and their carrying chains traveling in a direction away from the oven door or from any receiving point, are supported upon a run-way consisting of main side members 11, 12, of channel or other suitable form which are stationary throughout the main portion of the conveyer including the section $c$ and $c^2$ to the point where the delivery section $c'$ is hinged, as shown in Fig. 6; while the same elements 11', 12', constitute the supporting members of the lower run-way of the delivery section. Each of said sections is provided with a flat supporting bottom 13 and 13' respectively of plate metal secured underneath to the flanges of members 11 and 12, as more clearly shown on Sheet 4 of the drawings. Said plate constitutes the bottom over which the flights of the conveyer travel, and upon which the coke or other material is carried thereby.

The entire upper series of flights and their carrying chains traveling in a direction toward the oven door or away from the delivery point, are likewise mounted and carried by similar main elements as channels 14, 15, for main sections $c$ and $c^2$ and 14' and 15' for section $c'$ respectively.

Figures 12, 13:
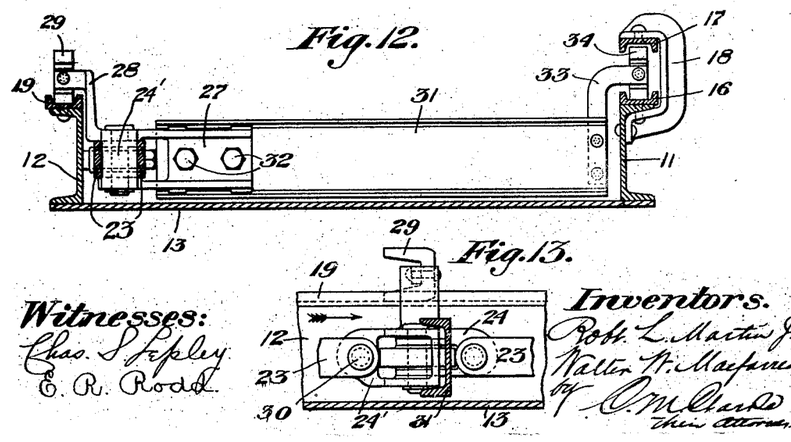
Fig. 12. is a cross section on the line XII. XII. of Fig. 10.
Fig. 13. is a similar sectional view on the line XIII. XIII. of Fig. 10, looking in the direction of the arrow.

Each of said supporting members 11 and 14, for the outer ends of the flights, are provided along their upper edges with slideways, troughs, or guides 16 of channel form, while similar guiding channels 17 having their flanges reversed downwardly as shown in Fig. 12, are mounted above said channels 16 of the lower member 11 by brackets 18, whereby a confining guiding slideway is provided for the terminal shoes of the flights along the lower or load carrying runway. Supporting members 12 and 15 are likewise provided along their upper edges with similar slideways 19 of channel form, but open at the top as is also channel 16 of upper member 14 as clearly shown, for engaging and supporting the sliding shoes of the flights and of the carrying chain. These guiding elements extend continuously along the main supporting members of the conveyer supporting structure, means for connecting them at the hinge juncture being provided as clearly shown on sheet 7 of the drawing and as hereinafter described.

Figure 4:
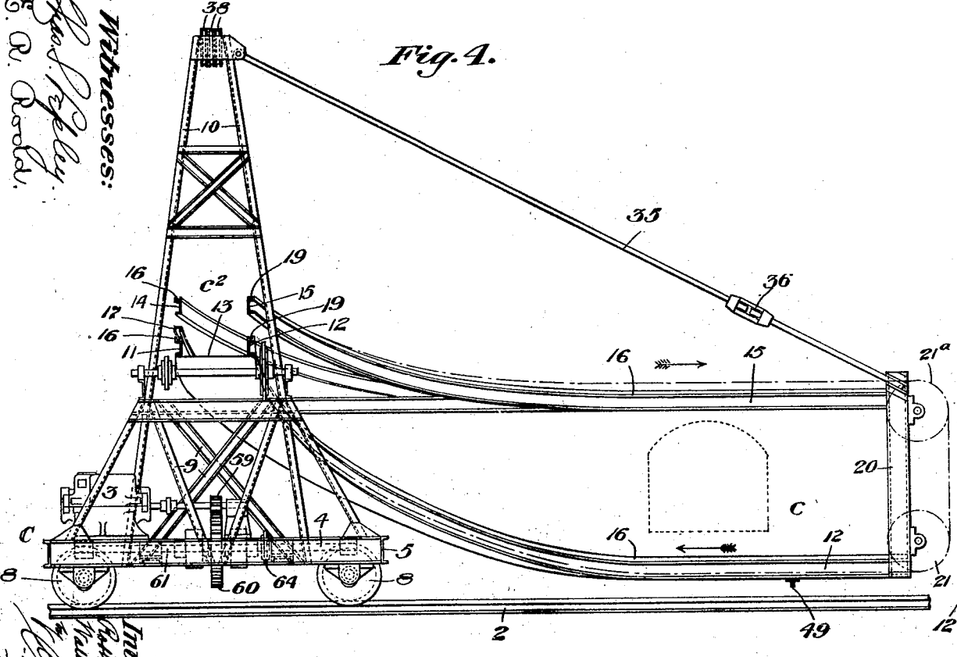
Fig. 4. is a sectional elevation of the apparatus, indicated by the line IV. IV.
of Fig. 1.
Figure 5:
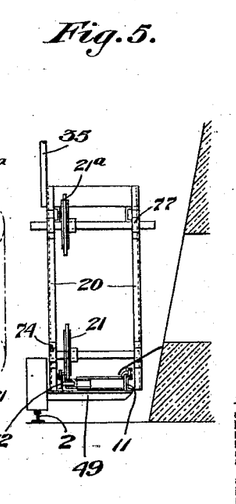
Fig. 5. is a view in elevation of the receiving end of the apparatus, indicating a portion of the drawing machine.

At the receiving end it will be observed that the lower members 11 and 12 are located at a suitable distance below the oven door, (shown in dotted lines in Fig. 4,) to receive the contents of the oven as drawn, while the upper supporting members 14, 15, are located sufficiently high above the top of the door to give ample clearance for the extracting element of the drawing machine, said parts of the conveyer being connected at their outer ends by means of vertical posts 20 as shown.

At the outer or delivery end of the conveyer the driving sprocket wheel 22 is mounted in suitable bearings, the lower and upper supporting elements 11, 12, and 14, 15, being brought into close parallel relation with each other as shown in Fig. 6, so as to facilitate the travel of the chain with relation to its driving sprocket 22. The chain carrying the flights throughout the conveyer trough or runways is single longitudinally as shown, and is composed of universally flexible elements consisting of links pivoted together in different planes alternately, preferably at right angles to each other, as clearly shown in detail on Sheet 4.

23, 23, are ordinary flat links pivoted at each end to link sections 24, 24, and providing between them the usual space for the teeth of the sprocket wheels. Links 24 connected by pin 25 carrying roller 26, connect adjacent pairs of links 23 as shown, while the alternating rollers 26' of the chain are mounted in similar links 24', one of said links 24' however being of special form for the purpose of attaching the flight. Said link is provided with a laterally extending bracket 27 at its inner side, and at the opposite side with an upwardly and outwardly extending bracket 28 carrying shoe 29 or other suitable guiding device adapted to run in channel 19 at the inner side of the conveyer framework. Such special form of link otherwise conforms to the links 24, connected at one end to links 23, and to each other by pivotal pin 25 carrying the roller 26 as stated, the pivotal pin 25 being at right angles to pivotal pin 30 for the flat links 23.

By this construction it will be seen that the chain as constructed of the alternate link sections and provided with the alternate differently hinged pivotal bearings, is flexible in both directions, i. e. vertically and horizontally, so that it will freely pass around and travel in the various directions above noted, and will be at the same time positively guided and supported by shoes 29 in their appropriate guiding runways 19, of the lower and upper members 12 and 15.

31 is the flight, of channel or other suitable form, attached by bolts 32 as shown to bracket 27 of each special link 24' which links are located a suitable distance apart to suit the requirements of the apparatus and admit of the coke in front of the flights. The flights 31 extend substantially across the area of the runway or trough, resting upon or preferably immediately above the floor plate 13, and are provided at their outer ends with brackets 33 extending upwardly and outwardly and having terminal shoes 34 similar to shoes 29, or other suitable guiding devices, mounted between the lower and upper guiding channels 16, 17, and adapted to travel through and be guided thereby. The shape of shoes 29 and 34 is clearly shown in Fig. 13, giving sufficient lower and upper bearing and having rounded corners so as to pass freely along the guiding channels. By means of said shoes it will be seen that the flights are supported, any tendency to disarrangement of the flights or torsion of the chain is avoided, and the entire structure is suitably braced against the various strains to which it is subjected in use.

Rollers 26 bearing against the inner channels 12 and being located in central alinement with the chain, provide rolling bearings, thereby facilitating the continuous easy travel of the structure.

When the conveyer is carrying a load, in front of each flight 31, the backward tendency of each flight is counteracted by and itself counteracts the tendency of its adjacent flights to deflect from the right angular arrangement with relation to the carrying chain. This is due to the fact that each flight and its links 23 and 24 constitutes a practically stiff bracket as to lateral movement up to the point where it is pivotally connected to the adjacent bracket by roller pin 25. The opposing strains under load are thus centralized and neutralized at each roller bearing.

The receiving end of the supporting structure is hung from the top of tower 10 by means of one or more supporting rods or tension members 35, preferably provided with turnbuckles 36 for adjustment, while such end of the apparatus is likewise supported upon a laterally extending arm 49 mounted upon and projecting from the extracting apparatus, as has been described in our prior application above referred to. On the other hand, the delivery end of the conveyer or section c' is supported by means of cables 37 passing around sheaves 38 and 39 at the top of the mast 10 and outer end of the conveyer section respectively, as clearly shown in Fig. 6, the free end of the cable passing downwardly to a suitable winch 40 adapted to be turned by the operator through suitable gearing and shaft 41, provided with a hand wheel 42. By such means the delivery end of the conveyer may be raised or lowered to the desired height and there maintained, it being understood that it is capable of adjustment within a sufficient degree to provide for delivering coke either into open top or box cars, or elsewhere upon the yard.

43 is a delivery chute or spout, as clearly shown on Sheet 3, rotatively mounted by means of rollers or wheels 44 upon a lower flange 45 of an upper section 46, mounted for longitudinal adjustment underneath the delivery conveyer section c'. The bottom plate 13 of the delivery section of the conveyer is provided with one or more outlet openings 47 and corresponding opening and closing gates 48 which may be conveniently mounted in slideways or otherwise as desired, and said openings may be of any number preferred as shown in Fig. 7. The upper section 46 of the delivery chute is mounted for longitudinal travel along the lower side of the delivery end of the conveyer by means of rollers or wheels 50 engaging the lower flanges of the main structural members 11', 12', and supporting by brackets 51 the section 46. Any other suitable supporting flanges may be substituted for said flanges. For the purpose of adjusting said section, together with the suspended terminal spout 43, sections 46 are provided at front and back with suitable connections 52, 52, to which are attached the cables or other flexible conductors 53, 53, the front one of said cables passing around suitable guiding sheaves 54, 54, and both cables passing backwardly, around sheaves 55 and to a winch 56 operated by worm gearing 57 or other suitable means from an operating shaft provided with a hand wheel 58, as clearly shown in Fig. 6. By such means, the delivery chute may be located underneath either one of the several openings 47, the other openings being closed by their doors, so that the coke as conveyed outwardly along the bottom plate 13 of the conveyer will be discharged downwardly through opening 47, section 46, and spout 43 into the car; or laterally to any point desired, depending upon the angle at which the spout 43 is turned, as suggested by the dotted lines of Fig. 7.

While separate motors may be employed to impart traction power to the axles of wheels 7 and 8 and also to actuate the conveying mechanism, I have utilized a single motor 3, from which by gearing 59 and 60 power is imparted either to shaft 61 and worms 62, 62, engaging worm wheels 63, 63, mounted on the axles to rotate them; or to sprocket wheel 64 to drive chain 65 and through suitable countershaft and reducing sprockets located adjacent to the hinge connection of the upper delivery section of the conveyer, to finally drive sprocket 66 through chain 67, as clearly shown in Figs. 1 and 6.

Driven gear wheel 60 is connected at each side with constantly driven portions 68 of clutches 69, through one of which clutches motion is intermittently transmitted to shaft 61 to propel the truck, and from the other clutch through a suitable sleeve 70 to sprocket wheel 64, to drive the conveyer. Ordinarily, propelling power is intermittently imparted to the axles, while the conveyer is preferably driven continuously during service.

In order to positively prevent reverse rotation of the head shaft 71 carrying the conveyer chain head sprocket 22, the driving sprocket 66 may be loosely mounted on shaft 71, as clearly shown in Figs. 2 and 3 and adapted to drive said shaft in the proper direction only, as indicated by the arrow, by spring-pressed pawls 72 engaging the teeth of a ratchet wheel 73, keyed to shaft 71. By this construction, should reverse motion be imparted to sprocket 66, it will have no effect whatever upon the conveyer, thereby absolutely preventing reverse motion.

Figure 14:
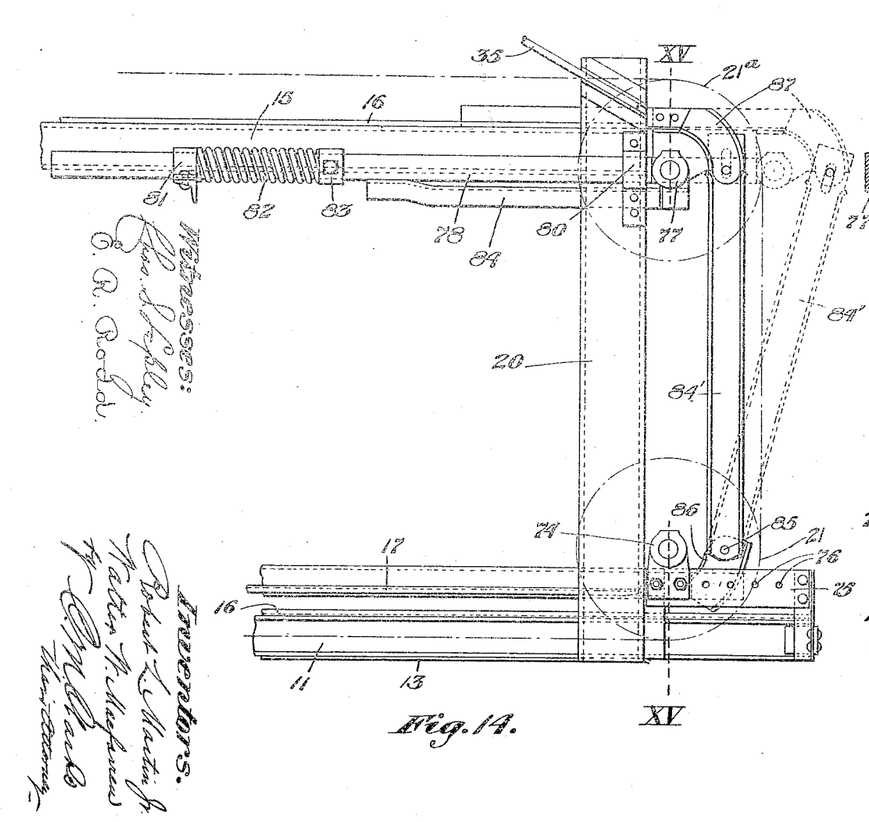
Fig. 14. is a detail view in elevation of the receiving end of the conveyer, showing the automatic take-up mechanism.
Figure 15:
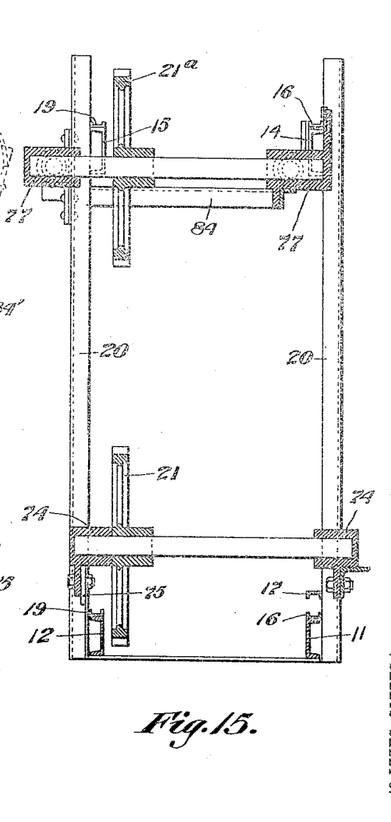
Fig. 15. is a vertical section on the line XV. XV. of Fig. 14.
Figure 16:
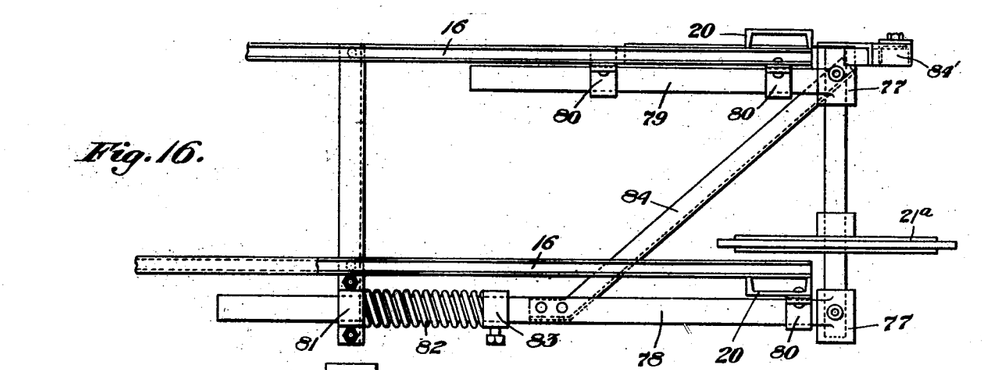
Figure 17:
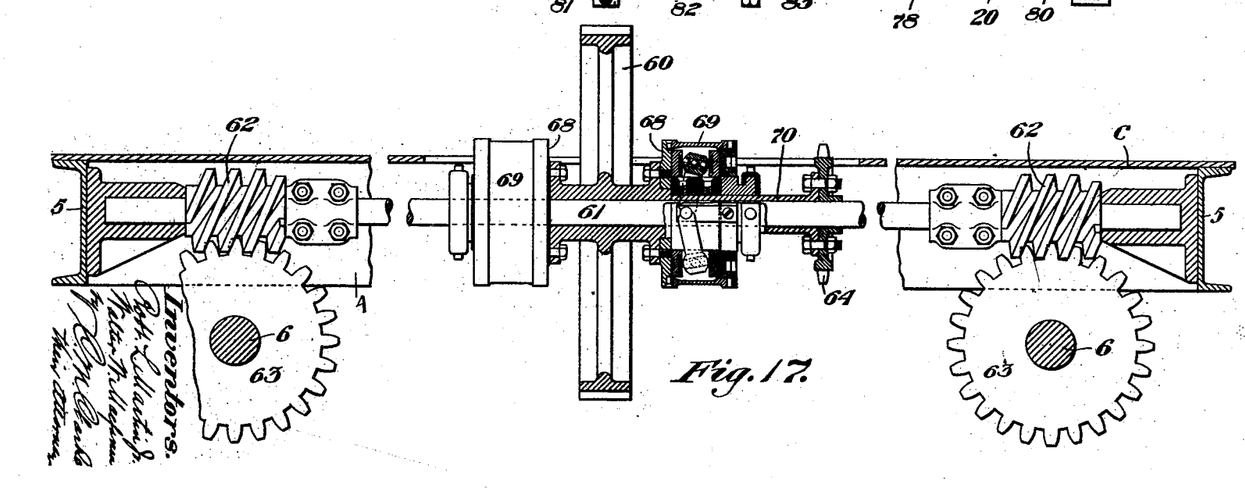

In Figs. 14, 15 and 16. I have shown in detail a construction whereby any slack of the chain, due to wear or vertical adjustment of the delivery end of the conveyer, may be automatically taken up. In such construction the lower idler sprocket wheel 21 is mounted in stationary bearings 74 which may be adjustably set outwardly from time to time in an extension 75 on the lower framework and secured thereon by means of bolts and the supplemental bolt holes 76 as shown, while the upper idler sprocket 21ᵃ is mounted in similar bearings 77 carried on the outer ends of sliding frames 78, 79, preferably of tubular form as shown, passing backwardly through suitable guides 80, 81, of the upper framework and at each side thereof, as shown in Fig. 16.

82 is a coiled compression spring inserted between rear bearing 81 and a collar 83 of frame 78, by which the entire sprocket-carrying framework, connected by a diagonal cross brace 84, will be automatically projected forwardly as indicated in dotted lines in Fig. 14, to take up the slack. The guiding frames 78 and 79 are of sufficient length to insure ample expansion, and it will be understood that should the stretch or slack of the chain at any time become excessive, it can be compensated for either by removing a section of the conveyer or a suitable number of links, or by setting the bearing 74 outwardly, as will be readily understood.

Figures 18, 19, 20, 21, 22:
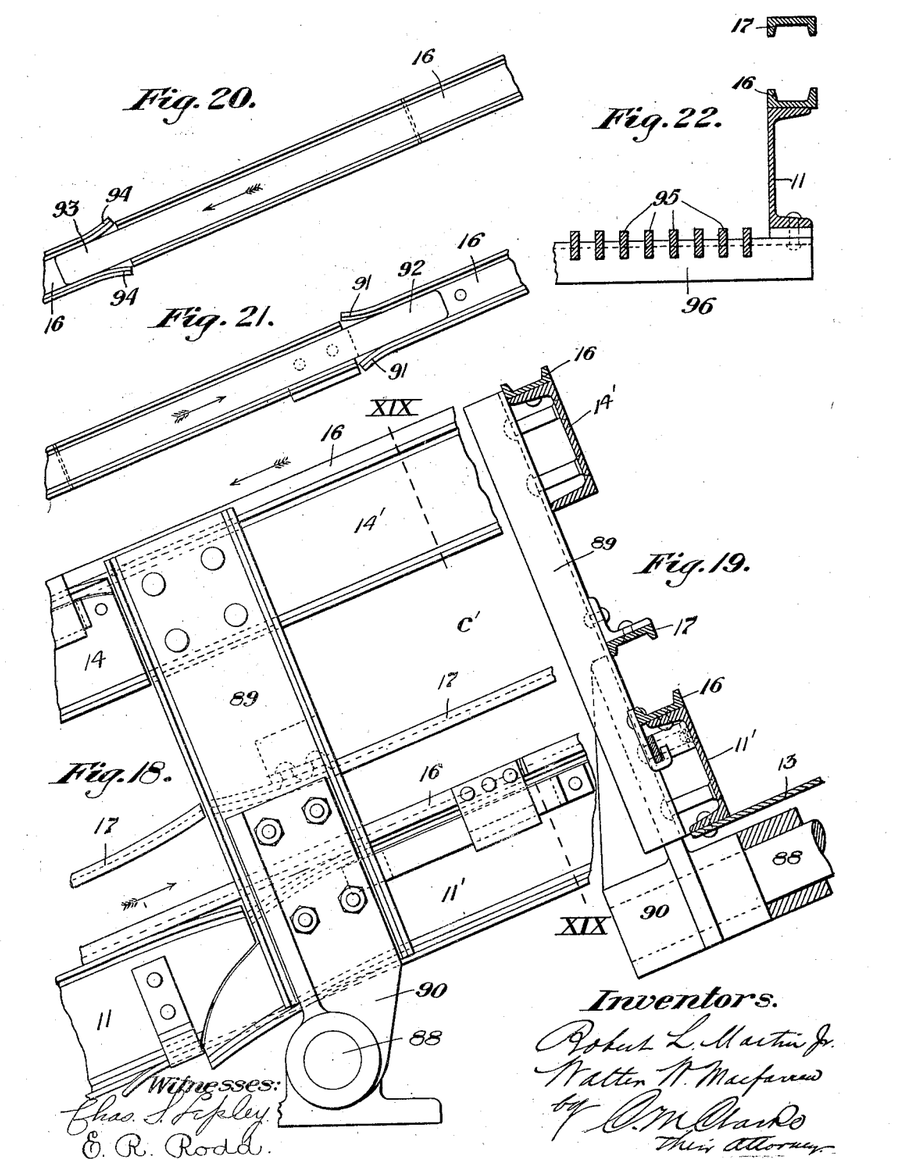
Fig. 18. is an enlarged detail view in elevation showing the hinge mounting for the delivery end of the conveyer.
Fig. 19. is a cross section on the line XIX. XIX. of Fig. 18.
Figs. 20 and 21 are plan views of the upper and lower runway guides for the flight shoes.
Fig. 22. is a sectional detail view showing the conveyer trough provided with bottom screen bars.

For the purpose of providing continuous runways for the shoes of the flights, vertical guides 84', preferably of channel form, are pivoted at 85 at the upper portion of curved continuations 86 of the horizontal guideways, being provided at their upper ends with similar curved continuations 87, for the same purpose. By this construction it will be seen that continuous slideways for the conveyer flights will be provided without interruption. For the purpose of similarly providing continuous slide-ways at the pivoted juncture of the stationary and movable sections of the main conveying frame, the outer section c' is pivotally mounted on cross shaft 88 as shown in Fig. 18. The lower and upper side members 11' and 14' are rigidly connected by a transverse bar 89 at each side of the conveyer, provided at their lower extremities with bearings 90 engaging shaft 88, which in turn is mounted in suitable bearings carried by the main structural framework.

When the delivery end of the conveyer is in erected position, (shown in Fig. 6) the separate guide-ways for shoes 29 and 34 are in alinement, the adjacent ends of upper channels 17 being flared upwardly as shown in Fig. 18 to insure easy travel from one to the other, while the side flanges of lower channels 16 and 19 are deflected laterally at the entering side as indicated at 91 for the same purpose. Likewise the bottom portion of the stationery slideway extends or laps over beyond the movable portion as indicated at 92, Fig. 21, thereby insuring passage of the shoes on to the adjustable guide-way of the conveyer at any position thereof. In the same manner the bottom portion of the upper channels 16 and 19 lap over onto the corresponding stationary channel as indicated at 93, Fig. 20, the side flanges of said stationary channel being flared outwardly as shown at 94 for the purpose of facilitating entrance of the shoe. By this construction, as the adjustable terminal of the conveyer is set in different positions, the operation of the conveyer will be facilitated, at all times insuring continuous uninterrupted service.

In Fig. 22 I have shown a construction of conveyer trough provided with screen bars 95 arranged along the bottom instead of the bottom plate, between the side members 11 and 12 and resting on suitable cross supports 96 in the manner well understood in conveyer practice. It will be seen that any portion of the conveyer trough may be provided with such screen bars or equivalent screening bottom so as to screen the small coke as the charge is conveyed along.

The operation of the invention will be readily understood from the foregoing description. It provides a continuous conveyer adapted to pass around corners or to traverse various planes without the necessity of any supplemental or auxiliary conveying mechanism, and in this respect constitutes an important advance in the conveying art. The invention may be variously changed or modified to suit local conditions of use; the apparatus may be designed for other uses than the particular one herein described, and may be utilized for various purposes or adaptations to convey material in other than straight lines, and will be found to be of great advantage in many different applications.

The construction may be modified by the skilled mechanic in different details, adaptation, design, or in other features but all such changes are to be considered as within the scope of the following claims.

What we claim is:—

1. A conveyer consisting of a continuous flexible structure arranged to travel in opposite directions through lower and upper planes respectively and in laterally variable directions, and means for supporting and guiding the conveyer consisting of a receiving section, a delivery section at a lateral angle thereto, and a traveling truck.

2. A conveyer consisting of a continuous flexible structure provided with laterally arranged flights arranged to travel in opposite directions through lower and upper planes respectively and in laterally variable directions, and means for supporting and guiding the conveyer consisting of a receiving section, a delivery section at a lateral angle thereto, and a traveling truck.

3. A conveyer consisting of a single continuous universally flexible structure provided with laterally arranged flights arranged to travel in opposite directions through lower and upper planes respectively and in laterally variable directions, and means for supporting and guiding the conveyer consisting of a receiving section, a delivery section at a lateral angle thereto, and a traveling truck.

4. A conveyer consisting of a continuous flexible structure provided with laterally arranged flights and guiding devices, arranged to travel in opposite directions through lower and upper planes respectively and in laterally variable directions, and means for supporting and guiding the conveyer consisting of a receiving section provided with terminal carrying wheels, a delivery section at a lateral angle thereto, and a traveling truck.

5. A conveyer consisting of a continuous flexible structure provided with laterally arranged flights and guiding and bearing shoes, arranged to travel in opposite directions through lower and upper planes respectively and in laterally variable directions, and means for supporting and guiding the conveyer provided with trackways for said guiding devices.

6. A portable conveyer consisting of a continuous flexible structure provided with bearing rollers, guiding devices, and laterally arranged flights, arranged to travel in opposite directions through lower and upper planes respectively and in laterally variable directions, and means for supporting and guiding the conveyer, and for moving it along supporting tracks substantially as set forth.

7. A conveyer consisting of a continuous flexible structure provided with bearing rollers and guiding devices, laterally arranged flights secured to the flexible structure having terminal guiding devices, and means for supporting the conveyer provided with terminal carrying wheels, substantially as set forth.

8. In a coke conveyer, the combination with a supporting structure arranged in varying planes and at varying angles, of a carrying chain composed of links pivotally connected together at varying angles, and provided with load-engaging flights extending laterally at one side and provided with guiding and supporting shoes.

9. In a coke conveyer, the combination with a supporting structure, of a chain composed of links pivotally connected at varying angles for flexibility in varying directions, some of said links having integral laterally arranged flight-attaching projections, and flights secured thereto provided with terminal guiding and bearing shoes at their opposite ends.

10. In a coke conveyer, the combination with a supporting structure, of a chain composed of links pivotally connected at varying angles for flexibility in varying directions, some of the links having integral laterally arranged flight-attaching projections, and flights secured thereto provided with terminal guiding and bearing shoes at their opposite ends, said links also having at their opposite sides integral guiding and bearing arms.

11. In a coke conveyer, the combination with a supporting structure of a chain composed of links pivotally connected at varying angles for flexibility in varying directions, some of said links having laterally arranged flight-attaching projections and supporting arms provided with bearing shoes, substantially as set forth.

12. In a coke conveyer, the combination with a supporting structure, of a flexible conveying mechanism consisting of links pivotally connected at varying angles for flexibility in varying directions, some of said links having laterally arranged flight-attaching projections, and flights attached thereto having terminal bearing devices, and bearing rollers mounted on the pivotal pins of intervening links, substantially as set forth.

13. In a coke conveyer, the combination with a supporting structure of series of links pivotally connected at varying angles for flexibility in varying directions, some of said links having laterally arranged bearing and guiding devices at one side and oppositely arranged carrying flights at the other side, substantially as set forth.

14. In a coke conveyer, the combination with a supporting structure of a series of links pivotally connected at varying angles for flexibility in varying directions, some of said links having laterally arranged bearing and guiding devices at one side, and oppositely arranged carrying flights at the other side provided with similar bearing and guiding devices, substantially as set forth.

15. In a conveyer, the combination of a variably flexible chain provided with guiding shoes and carrying flights, and a supporting frame therefor having lower and upper runways disposed in varying planes and similarly arranged guiding shoe runways.

16. In a conveyer, the combination of a variably flexible chain provided with guiding shoes and carrying flights, and a supporting frame therefor having lower and upper runways disposed in varying vertical and horizontal planes, and similarly arranged guiding shoe runways.

17. In a conveyer, the combination of a variably flexible chain provided with guiding shoes and carrying flights, and a supporting frame therefor having lower and upper runways arranged to provide a receiving portion, and a delivery portion arranged at a lateral angle to the receiving portion, and similarly arranged guiding shoe runways.

18. In a conveyer, the combination of a variably flexible chain provided with guiding shoes and carrying flights, and a supporting frame therefor having lower and upper runways arranged to provide a receiving portion, a delivery portion arranged at a lateral angle to the receiving portion, and an intervening curved connecting portion, and similarly arranged guiding shoe runways.

19. In a conveyer, the combination of a variably flexible chain provided with carrying flights, and a supporting frame therefor having lower and upper runways arranged to provide a receiving portion and a pivoted vertically adjustable delivery portion arranged at a lateral angle to the receiving portion.

20. In a conveyer, the combination of a variably flexible chain provided with carrying flights, and a supporting frame therefor having lower and upper runways disposed in varying planes, and provided with guiding and supporting bearings for the chain.

21. In a conveyer, the combination of a variably flexible chain provided with carrying flights, and a supporting frame therefor having lower and upper runways disposed in varying planes, and provided with guiding and supporting bearings for the chain and flights respectively.

22. In a conveyer, the combination of a variably flexible chain provided with rollers, flights, and bearing shoes; and a supporting frame therefor having a lower charge-supporting and lower and upper chain-and-flight-supporting runways disposed in varying planes, and provided with terminal carrying wheels for the chain.

23. In a conveyer, the combination of a variably flexible chain provided with rollers, flights, and bearing shoes; and a pivotally connected supporting frame therefor having a lower charge-supporting and lower and upper chain-and-flight-supporting runways disposed in varying planes, and provided with terminal carrying wheels for the chain.

24. In a conveyer, the combination of a variably flexible chain provided with rollers, flights, and bearing shoes; and a pivotally connected supporting frame therefor having a lower charge-supporting and lower and upper chain-and-flight-supporting runways disposed in varying planes and provided with terminal carrying wheels for the chain, and means for vertically adjusting one end of said frame.

25. In an apparatus of the class described, the combination with a coke drawer provided with a reciprocating extractor, of a truck coupled with the coke drawer, a conveyer frame mounted on the truck having a receiving section consisting of upper and lower flight-supporting portions adapted to be located alongside in front of and above and below an oven door respectively and to provide clearance area for the extractor, said conveyer frame having delivery portions extending outwardly at an angle to said receiving section, and a flexible chain provided with carrying flights mounted upon said frame.

26. In an apparatus of the class described, the combination with a coke drawer provided with a reciprocating extractor, of a truck coupled with the coke drawer, a conveyer frame mounted on the truck having a receiving section consisting of upper and lower flight-supporting portions adapted to be located alongside in front of and above and below an oven door respectively and to provide clearance area for the extractor, said conveyer frame having delivery portions extending outwardly at an angle to said receiving section, a flexible chain provided with carrying flights mounted upon said frame, and a motor for propelling the truck.

27. In a conveyer for coke ovens, the combination of a truck, a conveyer frame mounted thereon having an upper flight-supporting portion and a lower supporting bottom having guiding ways, arranged to provide a receiving portion; a delivery portion arranged at a lateral angle to the receiving portion, an intervening curved portion, a variably flexible chain having carrying flights mounted in said frame, terminal carrying wheels for the chain, and means for actuating the conveyer chain, substantially as set forth.

28. In a conveyer for coke ovens, the combination of a truck, a conveyer frame mounted thereon having an upper flight-supporting portion and a lower supporting bottom having guiding ways, arranged to provide a receiving portion; a delivery portion arranged at a lateral angle to the receiving portion, an intervening curved portion, a variably flexible chain having carrying flights mounted in said frame, terminal carrying wheels for the chain, means for propelling the truck, and means for actuating the conveyer chain, substantially as set forth.

29. In a conveyer for coke ovens, the combination of a truck, a conveyer frame mounted thereon having an upper flight-supporting portion adapted to be located in front of and above an oven door, a lower bottom portion adapted to be located in front of and below the oven door, a pivotally mounted delivery portion arranged at a lateral angle to the receiving portion, an intervening curved portion, means for vertically adjusting the delivery portion, a variably flexible chain having carrying flights mounted in said frame, terminal carrying wheels for the chain, means for propelling the truck, and means for actuating the conveyer chain, substantially as set forth.

30. In a coke conveyer provided with a supporting structure having an adjustable delivery section, and flexible traveling load-carrying mechanism mounted in said structure, the combination with the delivery section, of gated openings, and an adjustable delivery vessel.

31. In a coke conveyer provided with a supporting structure having a delivery section, and flexible travelling load-carrying mechanism mounted in said structure, the combination with the delivery section, of gated openings, and an adjustable delivery vessel having a laterally adjustable spout.

32. In a coke conveyer provided with a supporting structure having a delivery section, and flexible traveling load-carrying mechanism mounted in said structure, the combination with the delivery section, of gated openings, and an adjustable delivery vessel provided with an angular flange, and a laterally adjustable spout having bearing rollers mounted on said flange.

33. In a coke conveyer provided with a supporting structure having a delivery section, and flexible traveling load-carrying mechanism mounted in said structure, the combination with the delivery section, of gated openings, an adjustable delivery vessel having a laterally adjustable spout, a flexible adjusting device connected to the front and back of said delivery vessel, guiding devices for the flexible adjusting device, and a winding drum therefor.

34. In a conveyer of the class described, the combination with the upper and lower supporting mechanism adapted for location and operation above and below the oven door, of a terminal chain-carrying framework provided with a slidingly mounted frame carrying a chain wheel, and a spring arranged to exert pressure upon the frame against the pull of the chain, substantially as set forth.

35. In a conveyer of the class described, the combination with the upper and lower supporting mechanism adapted for location and operation above and below the oven door, of a spring-pressed frame carrying a chain wheel leading off from the upper carrying structure, a lower chain wheel leading to the lower carrying structure, and a pivoted guiding runway leading from the lower wheel to the upper wheel, substantially as set forth.

36. In a conveyer of the class described, the combination with the upper and lower supporting mechanism adapted for location and operation above and below the oven door, of a spring pressed frame carrying a chain wheel leading off from the upper carrying structure, a lower chain wheel leading to the lower carrying structure, horizontally adjustable bearings for the lower wheel, and a pivoted guiding runway leading from the lower wheel to the upper wheel, substantially as set forth.

37. In a conveyer comprising a fixed and a relatively movable guiding structure located in different planes and at varying angles and having a main upper and lower runway for a continuous flexible conveying mechanism, the combination with the fixed section provided with guiding runways, of the pivotally connected section having similar guiding runways, said runways having their sides flared at the receiving end, substantially as set forth.

38. In a conveyer comprising a fixed and a relatively movable guiding structure located in different planes and at varying angles and having a main upper and lower runway for a continuous flexible conveying mechanism, the combination with the fixed section provided with guiding runways, of the pivotally connected section having similar guiding runways, said runways having the bottom portions of their delivery ends lapping over the bottom portions of the receiving ends of the co-acting adjacent runways, substantially as set forth.

39. In a conveyer of the class described, the combination with the supporting truck and the conveyer-supporting framework, and traveling conveying mechanism mounted thereon; mechanism for propelling the truck and operating the conveyer from a single motor consisting in the combination of a propelling shaft gearing with the wheel axle, a motor-driven wheel loosely sleeved on said propelling shaft, a sprocket wheel loosely sleeved on the propelling shaft, and separate clutch mechanism secured to the motor-driven wheels at opposite sides and adapted to impart motion to the propelling shaft and to the sprocket wheel respectively, substantially as set forth.

40. In a conveyer of the class described, the combination with the supporting truck and the conveyer-supporting framework, and traveling conveying mechanism mounted thereon; mechanism for propelling the truck and operating the conveyer from a single motor consisting in the combination of a propelling shaft gearing with the wheel axle, a motor-driven wheel loosely sleeved on said propelling shaft, a sprocket wheel loosely sleeved on the propelling shaft, and separate clutch mechanism secured to the motor-driven wheels at opposite sides and adapted to impart motion to the propelling shaft and to the sprocket wheel respectively, with means for connecting or disconnecting each of said clutch mechanisms independently of the other, substantially as set forth.

In testimony whereof we affix our signatures in presence of two witnesses.

ROBERT L. MARTIN, Jr.
WALTER W. MACFARREN.

Witnesses:
CHAS. S. LEPLEY,
C. M. CLARKE.